US006886397B2

(12) United States Patent
Esteghlal et al.

(10) Patent No.: US 6,886,397 B2
(45) Date of Patent: May 3, 2005

(54) METHOD FOR THE DIAGNOSIS A TANK VENTILATION VALVE

(75) Inventors: Gholamabas Esteghlal, Ludwigsburg (DE); Dieter Lederer, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/363,338

(22) PCT Filed: Aug. 23, 2001

(86) PCT No.: PCT/DE01/03225

§ 371 (c)(1), (2), (4) Date: Aug. 7, 2003

(87) PCT Pub. No.: WO02/18165

PCT Pub. Date: Mar. 7, 2002

(65) Prior Publication Data

US 2004/0040537 A1 Mar. 4, 2004

(30) Foreign Application Priority Data

Sep. 1, 2000 (DE) ........................................ 100 43 071

(51) Int. Cl.[7] ............................................... G01M 15/00

(52) U.S. Cl. ..................................... 73/118.1; 73/119 R

(58) Field of Search ................................ 73/116, 117.2, 73/117.3, 118.1, 119 R; 340/438, 439; 701/29

(56) References Cited

U.S. PATENT DOCUMENTS 6,182,642 B1 * 2/2001 Ohkuma ..................... 123/520
6,739,310 B2 * 5/2004 Esteghlal et al. ........... 123/295
2002/0189596 A1 * 12/2002 Hanazaki et al. ........... 123/520
2003/0051716 A1 * 3/2003 Esteghlal et al. ........... 123/698

FOREIGN PATENT DOCUMENTS

| | | |
|---|---|---|
| DE | 36 24 441 | 1/1988 |
| DE | 39 14 536 | 11/1990 |
| DE | 195 02 775 | 6/1996 |
| JP | 11 343 925 | 12/1999 |

* cited by examiner

*Primary Examiner*—Eric S. McCall
(74) *Attorney, Agent, or Firm*—Kenyon & Kenyon

(57) ABSTRACT

A method is introduced for testing the operability of a tank vent valve between an internal combustion engine and a fuel vapor reservoir, in which the stored fuel vapor is supplied from the fuel vapor storage to the internal combustion engine when the tank vent valve is open, and in which the fuel vapor supply represents a first energy flow to the internal combustion engine, and in which air also flows to the internal combustion engine via a throttle valve, and, in which a second energy flow is assigned to this air, and in which an arrangement is provided which holds the sum of the two energy flows at a predefined value, and in which the tank vent valve is controlled in an opening manner, and in which a change in the energy flow delta E through the throttle valve, resulting from the opening control, is determined, and is compared to a predetermined threshold, and in which and a small change in the energy flow, which does not exceed the threshold value (threshold), is evaluated as a fault.

5 Claims, 2 Drawing Sheets

METHOD FOR THE DIAGNOSIS A TANK VENTILATION VALVE

This application is the national phase of PCT/DE01/03225 filed on Aug. 23, 2001.

FIELD OF THE INVENTION

The present invention relates to a method for diagnosing the tank vent valve in internal combustion engines.

BACKGROUND INFORMATION

It is known that one can open a tank vent valve during the operation of the engine and evaluate a reaction from a fuel/air ratio control loop for the diagnosis. The fuel vapor mixed with air, from the tank venting (purge gas) has the effect of disturbing the control circuit, so that the occurring of the disturbance indicates an efficient tank venting, and thus particularly a functional tank venting valve.

The problem is that, in engines that are able to run on lean mixtures, the reaction turns out to be weaker, the lower the proportion of fuel in the purge gas. In the case of purge gas that is loaded only weakly with fuel, no reliable differentiation between defective and functional systems is possible.

The present invention aims at making possible a reliable diagnosis that is not dependent on the fuel proportion of the purge gas.

This aim is achieved using a method for testing the operability of a tank venting valve between an internal combustion engine and a fuel vapor trap, the stored fuel vapor being guided from the fuel vapor trap to the internal combustion engine when the tank vent valve is open, and the fuel vapor supply representing a first energy flow to the internal combustion engine, and air also flowing to the internal combustion engine via a throttle valve, and a second energy flow being assigned to this air, and means being provided which maintain the sum of the two energy flows at a predefined value when the tank vent valve is controlled in an opening manner, and the tank vent valve being controlled in an opening manner, and a change in the energy flow delta E via the throttle valve, resulting from the opening control, being determined and being compared to a predetermined threshold, and a small change in the energy flow, which does not exceed the threshold value (threshold) being evaluated as a fault in the tank vent valve.

A further specific embodiment provides that a sufficiently great energy flow change, which exceeds the threshold value (threshold), is evaluated as a sign of a well functioning tank vent valve.

A further specific embodiment provides that the energy flow through the throttle valve is defined as the product of the air flowing through the throttle valve and the efficiency with which this air is burned after being mixed with fuel.

Another specific embodiment provides that, for determining the energy flow change, first of all a first charge detection is made via an intake manifold pressure sensor, and a second charge detection is made via an evaluation of the throttle valve position in conjunction with the engine speed, and the cylinder charge with air at a given engine speed being determined by the partial pressure proportion of the air in the intake manifold pressure, and the air mass flowing through the throttle valve, which represents a factor of the energy flow, being controlled by the control device in such a way that, for example, at constant load of the engine when idling a stable engine speed sets in.

Still another specific embodiment provides that, when the throttle valve is already almost completely closed even before the opening of the tank vent valve, the additional torque which results from the additional charge from the open tank vent valve, is dissipated via a decline in ignition timing efficiency.

The present invention also relates to an electronic control device for implementing at least one of the methods and specific embodiments mentioned above.

What is essential is an opening of the tank vent valve and an evaluation of the change, resulting from the opening, of a quantity which may be denoted, so to speak, as the energy flow through the throttle valve. In this context, the energy flow may be defined as the product of the air flowing through the throttle valve and the efficiency with which this air is burned after being mixed with fuel.

By contrast to an energy flow change that is too low, a sufficiently great energy flow change, which exceeds the threshold value (threshold), may be evaluated as a sign of a well functioning tank vent valve.

For determining the energy flow change, first of all a first charge detection is made via an intake manifold pressure sensor, and a second charge detection is made via an evaluation of the throttle valve position in conjunction with the engine speed. In this context, the cylinder charge with air at a given engine speed may be determined by the partial pressure proportion of the air in the intake manifold pressure, and the air mass flowing through the throttle valve, which represents a factor of the energy flow, may be controlled by the control unit in such a way that, for example, at constant load of the engine when idling, a stable engine speed sets in. In an efficient overall system, the intake manifold pressure does not change when the tank vent valve is opened, because the additional opening cross section of the tank vent valve is compensated for by a reduction in the opening cross section of the throttle valve. The reduction in the opening cross section of the throttle valve is correlated with the change in the energy flow through the throttle valve.

In one specific embodiment, when the throttle valve is already almost completely closed even before the opening of the tank vent valve, there then occurs a dissipation of the additional torque which results from the additional charge from the open tank vent valve, via a decline in ignition timing efficiency. In other words: If no sufficient compensation for the purge gas influence is possible by resetting the throttle valve opening angle, the resulting additional torque is reduced by an efficiency decline in another parameter.

The method according to the present invention advantageously permits a reliable differentiation between defective and well functioning tank vent valves, independently of the fuel proportion in the purge gas.

In particular it advantageously permits a diagnosis of the tank vent valve in lean operation, as is meaningful, for instance, in the case of internal combustion engines having direct gasoline injection. Because the diagnosis may be carried out in lean operation, it is not necessary to interrupt the lean operation for a diagnosis of the tank vent valve. This saves fuel compared to a diagnosis outside the lean operation.

DETAILED DESCRIPTION

Figure 1:
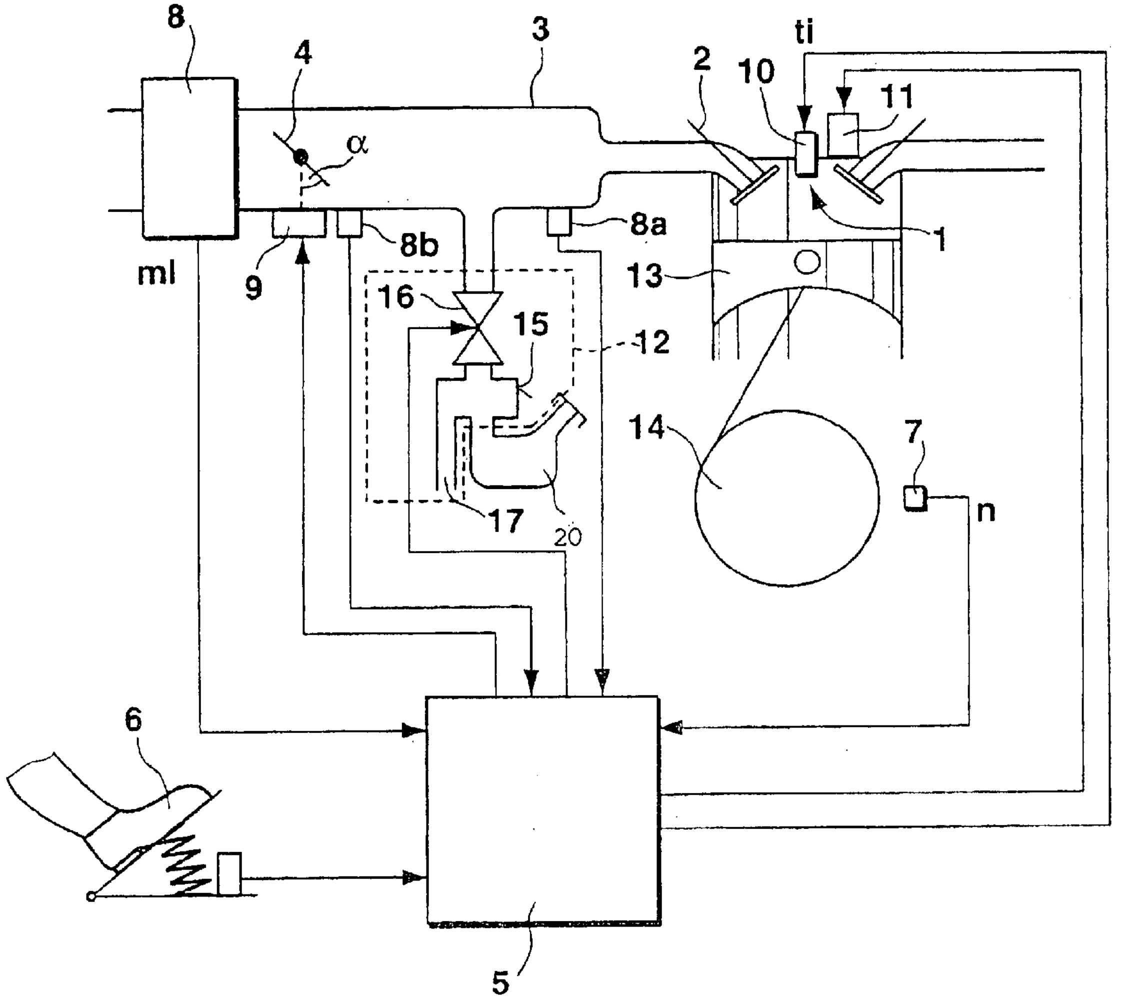
FIG. 1 shows the technical environment in which the present invention finds use.

Reference numeral 1 in FIG. 1 represents the combustion chamber of a cylinder of an internal combustion engine. The flow of air into the combustion chamber is controlled via intake valve 2. The air is drawn in via an intake manifold 3. The intake-air quantity may be varied using a throttle valve 4, which is controlled by control device 5. Signals regarding the torque desired by the driver, such as by the position of an accelerator 6, a signal regarding the rotational engine speed n of a speed sensor 7 and a signal regarding the quantity ml of the drawn-in air are supplied by an air-mass flow sensor 8 to the control device.

Additionally supplementing or alternative to air-mass flow sensor 8 there is an intake manifold pressure sensor 8*a* and/or a throttle valve position sensor 8*b* for measuring air-mass flow. From here on, instead of the concept air-mass flow measurement, the concept of charge detection is also used. The concept of charge denotes the air quantity in a single cylinder, and it circumscribes the air quantity with reference to the charge of a single cylinder. As a first approximation, this is the intake air quantity of the internal combustion engine divided by the number of cylinders and the engine speed, and is thus normalized to one stroke.

From these and possibly other input signals regarding further parameters of the internal combustion engine, such as intake air and coolant temperature and others, control device 5 generates output signals for setting throttle-valve angle alpha by an actuator 9, and for controlling a fuel injector 10, which dispenses the fuel into the combustion chamber of the engine. In addition, the control unit controls the triggering of the ignition via an ignition device 11.

Throttle-valve angle alpha and the injection-pulse width ti are essential controlled variables that must be adjusted to each other to achieve the desired torque. A further, essential controlled variable for influencing torque is the angular position of the ignition relative to the piston travel.

Determining the controlled variables for torque adjustment is the subject matter of DE 1 98 51 990, which is to be included to this extent in the disclosure.

The control device also controls a tank ventilation 12 as well as other functions for achieving an efficient combustion of the fuel/air mixture in the combustion chamber. The gas force resulting from the combustion is converted into torque by piston 13 and crank mechanism 14.

Tank ventilation system 12 is made up of an activated charcoal filter 15, which communicates via appropriate lines or terminals with tank 20, ambient air and the intake manifold of the internal combustion engine, a tank ventilation valve 16 being located in the line to the intake manifold.

Activated charcoal filter 15 stores evaporating fuel evaporating in tank 20. As tank-ventilation valve 11 is opened by control device 6, air is drawn in from environment 17 through the activated charcoal filter, which at the same time releases the stored fuel into the air. This fuel/air mixture, also known as tank ventilation mixture or also as purge gas, influences the composition of the mixture supplied as a whole to the internal combustion engine. It should also be mentioned that the fuel portion of the mixture is codetermined by fuel-metering device 10, which is adapted to the drawn-in air quantity. In extreme cases, the fuel drawn in via the tank ventilation system may constitute a proportion of approximately one-third to one-half of the entire fuel quantity.

Figure 2:
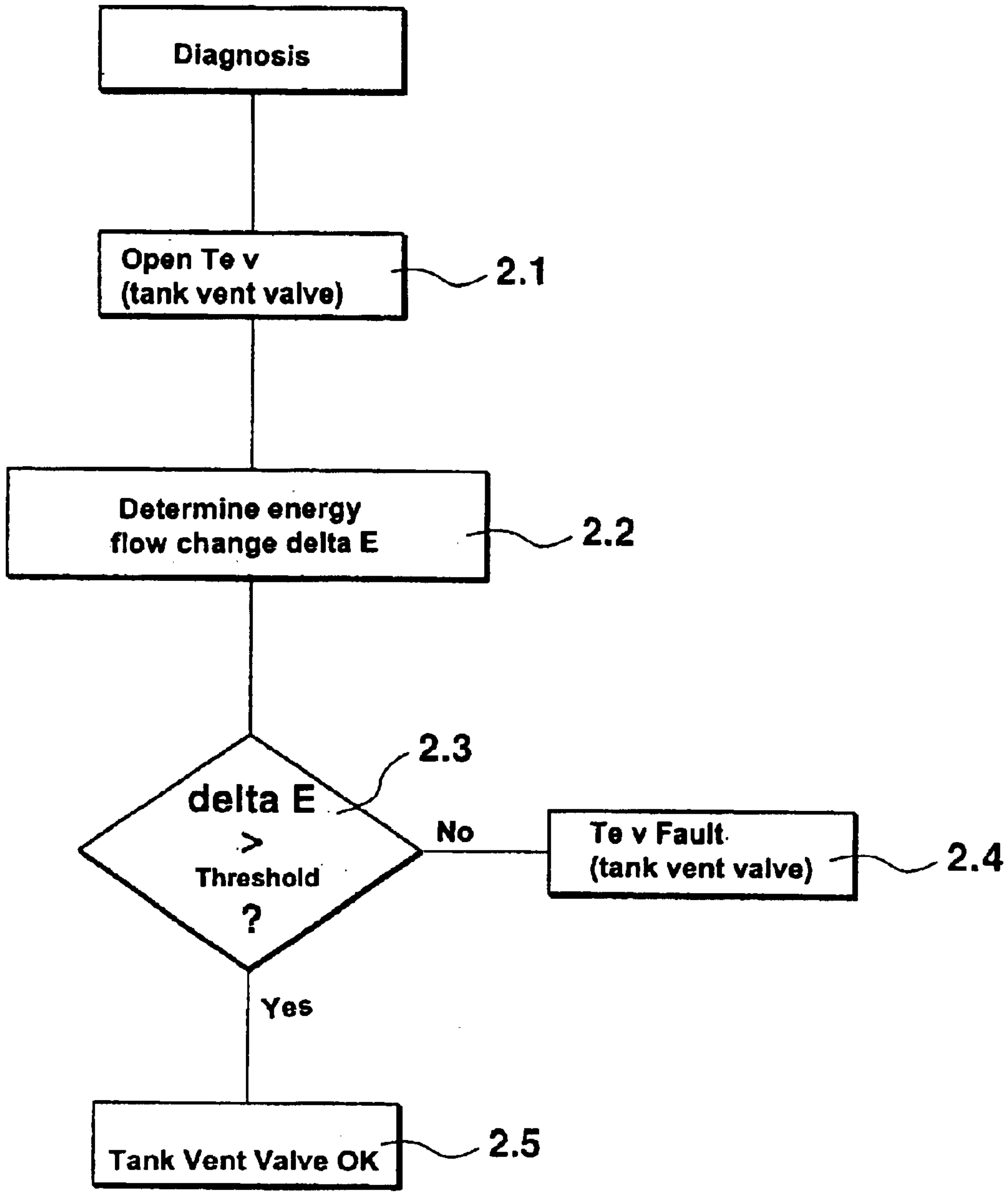
FIG. 2 shows a flow diagram as an exemplary embodiment of the method of the present invention.

FIG. 2 shows a flow diagram as an exemplary embodiment of the method of the present invention.

In a step 2.1 tank vent valve is controlled to open. Step 2.2 is used for determining the change delta E of the energy flow through the throttle valve after the opening control of the tank vent valve. Examples for the determination of delta E are given farther below.

In step 2.3 a comparison is made of energy flow change delta E with a predetermined threshold.

A small change in the energy flow, which does not exceed the threshold value (threshold) is evaluated as a fault in step 2.4. This evaluation may, for instance, be undertaken in the control of a fault lamp or also in the storing of the fault message in the control unit.

A sufficiently large energy flow change which exceeds the threshold value (threshold), on the other hand, is evaluated in step 2.5 as a sign of a well functioning tank vent valve.

The energy flow change can, for example, be determined in the following manner, first of all a first charge detection via an intake manifold pressure sensor being assumed, and a second charge detection via an evaluation of the throttle valve position in conjunction with the engine speed being assumed.

The cylinder charge with air is determined at a given engine speed by the partial pressure proportion of the air in the intake manifold pressure.

In this context, the air mass flowing through the throttle valve, which represents a factor of the energy flow, is controlled by the control device in such a way that, for example, at constant load of the engine when idling, a stable engine speed sets in.

In parallel to the detection of the charge via the measured intake manifold pressure, there takes place a charge detection from position alpha of the throttle valve and rotational speed n (alpha, n-charge detection).

When the tank vent valve is closed, the two charge detections are adjusted, or rather the values of both detections are assigned to each other as equal.

Subsequently, the opening control of the tank vent valve is carried out.

In the case of a well functioning tank vent valve, the purge gas flows into the intake manifold. At first the intake manifold pressure rises. This is registered by the charge detection, which therefore controls the throttle valve to close, until the initial intake manifold pressure has been reached again. This (pressure) determines the charge, and thereby the actual torque.

Once again, the air quantity and the charge are calculated from alpha and n. Because of the now changed throttle valve position (smaller opening angle), the alpha, n-charge detection yields a changed value. The change is proportional to the change in the energy flow through the throttle valve.

As an alternative to this, the change in energy flow through the throttle valve may be determined from the reaction of a speed controller: The energy flow via the throttle valve changes, for instance, because of the reaction of a speed controller on the inflow of fuel/air mixture via the tank vent valve into the intake manifold. If the throttle valve setting remained unchanged, the intake manifold pressure, and thus the cylinder charge would increase upon the inflow of air or fuel vapor. The increasing cylinder charge would lead to an increasing speed because of the rising torque. The speed controller reacts to this by exerting a closing control on the throttle valve. From the extent of the closing adjustment, the change in the energy flow can be determined in step 2.2.

A change that turns out to be sufficiently great indicates a well functioning tank vent valve.

One problem is that, during idling, the throttle valve is already approximately completely closed. The additional torque, which results from the additional charge from the opened tank vent valve, can then no longer be compensated for by way of a further closing of the throttle valve. In this case, for example, the additional torque is compensated for by way of a decline in the ignition timing efficiency. Here the association of the product of efficiency and air mass flow through the throttle valve with the quantity defined as the energy flow comes in useful. The energy flow through the throttle valve is, in particular, proportional to the product of the air mass flow through the throttle valve and the ignition timing efficiency.

An ignition timing efficiency of, for instance, 100% means that the combustion energy obtained as a maximum from the air mass taken in after mixing with fuel is converted to torque.

If the ignition timing efficiency is, for instance, 80%, in corresponding fashion only 80% of the theoretical maximum value is converted to torque.

Effectively this is the same as if only 80% of a comparison air mass were converted to torque at a rate of 100%.

In other words: On the one hand, a fictitious air mass may be associated with the product of ignition timing efficiency and air mass. On the other hand, an energy flow may be associated with the air mass flow through the throttle valve by a linkage with the ignition timing efficiency, the energy flow corresponding to a fictitious air mass which, after being mixed with the fuel, is converted 100% into energy and torque.

In the case of a completely closed throttle valve before the diagnosis, say that the quantity of unmetered air flowing in this state is 4 kg per hour. Say that this is converted into torque at an ignition timing efficiency of 100%.

That produces the same torque as from 5 kg of air that is converted at an ignition timing efficiency of 80%.

In other words: A fictitious air mass of 1 kg may be assigned to an ignition timing decline by 20%.

According to the present invention, this is used to make the diagnosis:

On the assumption that the unwanted torque increase after opening the tank vent valve cannot be compensated for by a further throttling of the intake air quantity, a compensation is carried out via an ignition timing efficiency decline.

Since the ignition timing efficiency is known in the control unit, the energy flow change may be determined and evaluated for the diagnosis.

In the case of a diagnosis in stratified operation of engines having direct gasoline injection, the problem of an almost closed throttle valve does not arise.

Stratified operation in direct gasoline injection is distinguished by approximately unthrottled operation having a great excess of air.

For this, the throttle valve is open up to about 80%. The torque is not set by using the quantity of the mixture, but via the quality of the mixture, i.e. the fuel quantity. The combustibility of the mixture having a great excess of air is achieved in this case by a spatially inhomogeneous distribution of the mixture in the combustion chamber. This method of operation is also known as stratified operation. An operation using homogeneous mixture distribution not having, or having a small excess of air may be differentiated from this. The incomplete opening of the throttle valve in stratified operation has the effect of a so-called throttling, which sees to it that the absolute intake manifold pressure does not exceed a predefined value. One criterion for the position of this value is, for example, the minimum moment which may be set by variation of the fuel quantity at a given cylinder charge. Thus, the fuel quantity may not drop below a minimum value below which the mixture is no longer combustible. If this minimum value is in conjunction with too high a moment at high intake manifold pressure, the intake manifold pressure has to be reduced by the aforementioned throttling.

External requirements on the intake manifold pressure in stratified operation further come about, for example, in that the exhaust-gas recirculation and the tank venting require a certain pressure difference. The requirement which calls for the lowest intake manifold pressure is implemented by a minimum selection and intervention in the setting of the throttle valve.

In stratified operation, the diagnosis takes place as follows: First of all, a certain throttling is set by the throttle valve, such as to an intake manifold pressure of 700 mbar, so that, when the tank vent valve is opened, the combustibility limit is not undershot.

Upon the subsequent opening of the intact tank vent valve, the pressure increases to, for instance, 800 mbar, which is registered by the intake manifold pressure sensor.

In view of that, the pressure increase indicates an intact tank vent valve. If the pressure increase is too big, the throttling is increased. In this case, the increase in the throttling represents a measure for the operability of the tank vent valve.

Alternatives:

For the diagnosis in homogeneous operation, instead of recording the charge using the intake manifold pressure sensor, one may record the charge using a hot film air mass meter.

Instead of comparing the change of the energy flow to a threshold value, the change may also be compared to an expected value, which sets in in a functionable system. In this case, too great a deviation indicates a fault.

What is claimed is:

1. A method for testing an operability of a tank vent valve between an internal combustion engine and a fuel vapor reservoir, comprising:

supplying a stored fuel vapor from the fuel vapor reservoir to the internal combustion engine when the tank vent valve is open, a fuel vapor supply representing a first energy flow to the internal combustion engine;

allowing air to flow to the internal combustion engine through a throttle valve, a second energy flow being assigned to the air, the second energy flow being defined as a product of the air flowing through the throttle valve and an efficiency with which the air is burned after being mixed with a fuel;

holding a sum of the first energy flow and the second energy flow to a predefined value when the tank vent valve is controlled in an opening manner;

controlling the tank vent valve by performing an opening control;

determining a change in energy flow through the throttle valve, resulting from the opening control;

comparing the change in energy flow to a predetermined threshold; and evaluating as a fault the change in energy flow when the change in energy flow is small and does not exceed the predetermined threshold.

2. The method as recited in claim 1, further comprising:

when the change in energy flow is sufficiently large and exceeds the predetermined threshold, determining the change in energy flow as a sign of a well functioning tank vent valve.

3. The method as recited in claim 1, wherein in order to determine the change in energy flow:

a first charge detection is made via an intake manifold pressure sensor, a second charge detection is made via an evaluation of a throttle valve position in conjunction with an engine speed, a cylinder charge at a given engine speed is determined using the air, by a partial pressure proportion of the air in an intake manifold pressure, and an air mass flowing through the throttle valve, which represents a factor of energy flow, is controlled by a control device in such a way that at a constant load of the internal combustion engine when idling, a stable engine speed sets in.

4. The method as recited in claim 1, wherein:

when the throttle valve is already almost completely closed even before an opening of the tank vent valve, an additional torque that results from an additional charge from the tank vent valve when open is dissipated via a decline in an ignition timing efficiency.

5. An electronic control device for testing an operability of a tank vent valve between an internal combustion engine and a fuel vapor reservoir, comprising:

an arrangement for supplying a stored fuel vapor from the fuel vapor reservoir to the internal combustion engine when the tank vent valve is open, a fuel vapor supply representing a first energy flow to the internal combustion engine;

an arrangement for allowing air to flow to the internal combustion engine through a throttle valve, a second energy flow being assigned to the air, the second energy flow being defined as a product of the air flowing through the throttle valve and an efficiency with which the air is burned after being mixed with a fuel;

an arrangement for holding a sum of the first energy flow and the second energy flow to a predefined value when the tank vent valve is controlled in an opening manner;

an arrangement for controlling the tank vent valve by performing an opening control;

an arrangement for determining a change in energy flow through the throttle valve, resulting from the opening control;

an arrangement for comparing the change in energy flow to a predetermined threshold; and an arrangement for evaluating as a fault the change in energy flow when the change in energy flow is small and does not exceed the predetermined threshold.

* * * * *